United States Patent
Su et al.

(10) Patent No.: US 9,484,756 B2
(45) Date of Patent: Nov. 1, 2016

(54) BATTERY HAVING MULTI-ORIENTATION CONDUCTIONS, BATTERY HOLDER HAVING MULTI-ORIENTATION CONDUCTIONS, AND BATTERY ASSEMBLING METHOD

(75) Inventors: Huang-Wen Su, Taipei (TW); Hung-Hsiang Chen, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 147 days.

(21) Appl. No.: 13/449,272

(22) Filed: Apr. 17, 2012

(65) Prior Publication Data
US 2013/0052502 A1 Feb. 28, 2013

(30) Foreign Application Priority Data

Aug. 24, 2011 (CN) .......................... 2011 1 0243222

(51) Int. Cl.
*H02J 7/00* (2006.01)
*H01M 2/10* (2006.01)
*H01R 13/24* (2006.01)

(52) U.S. Cl.
CPC .......... *H02J 7/0045* (2013.01); *H01M 2/1022* (2013.01); *H01R 13/24* (2013.01); *Y10T 29/49108* (2015.01)

(58) Field of Classification Search
CPC ...... H01M 2/02; H01M 2/06; H01M 2/0232; H01M 2/1022; H01M 2/22–2/28; H01M 10/46; H02J 7/0045; H01R 13/24; Y01T 29/49108
USPC ......... 429/99, 100, 159, 128, 131, 133, 170, 429/179, 210, 211
See application file for complete search history.

(56) References Cited

U.S. PATENT DOCUMENTS

| | | | | |
|---|---|---|---|---|
| 3,506,902 A | * | 4/1970 | Sullivan | 320/106 |
| 4,382,219 A | * | 5/1983 | Heine et al. | 320/106 |
| 4,997,731 A | * | 3/1991 | Machida et al. | 429/90 |

(Continued)

FOREIGN PATENT DOCUMENTS

| CN | 1949603 A | 4/2007 |
|---|---|---|
| CN | 101777721 A | 7/2010 |

(Continued)

OTHER PUBLICATIONS

Translation of JP0997600 Specification.*

*Primary Examiner* — Milton I Cano
*Assistant Examiner* — Philip A Stuckey (57) ABSTRACT

A battery includes a casing, a battery pack, and at least two electrical connecting assemblies. The casing includes an inner space and plural contact planes. Vertical directions of the contact planes are different. The battery pack includes a battery cell disposed in the inner space, and the battery cell includes a positive and a negative electrodes. The electrical connecting assemblies are electrically connected to the positive electrode and the negative electrode respectively, so as to transmit power between the battery pack and an electronic device. The electrical connecting assembly electrically connected to the positive electrode is arranged on at least two of the contact planes, and the electrical connecting assembly electrically connected to the negative electrode is arranged on at least two of the contact planes. If power supply in one certain direction is interrupted, the battery transmits power in the other directions, thereby avoiding power supply from being interrupted.

11 Claims, 11 Drawing Sheets

(56) References Cited

U.S. PATENT DOCUMENTS

| | | | |
|---|---|---|---|
| 5,443,924 A * | 8/1995 | Spellman | 429/65 |
| 5,473,242 A | 12/1995 | McKenna | |
| 6,018,230 A | 1/2000 | Casey | |
| 6,123,569 A * | 9/2000 | Fukushima et al. | 439/456 |
| 6,391,490 B1 * | 5/2002 | Aoi et al. | 429/176 |
| 2005/0088140 A1 * | 4/2005 | Bushong et al. | 320/107 |
| 2006/0208695 A1 * | 9/2006 | Weinstein et al. | 320/110 |
| 2006/0232239 A1 * | 10/2006 | Maglica et al. | 320/107 |
| 2006/0275656 A1 * | 12/2006 | Feddrix et al. | 429/179 |
| 2007/0243457 A1 * | 10/2007 | Viduya | H01M 2/1022 429/96 |
| 2008/0008929 A1 * | 1/2008 | Wheeler et al. | 429/99 |
| 2008/0166629 A1 * | 7/2008 | Shiau | 429/169 |
| 2009/0021897 A1 * | 1/2009 | Katzenberger | H01M 2/1022 361/679.31 |
| 2010/0239903 A1 * | 9/2010 | Churchill | H01M 2/1022 429/178 |
| 2012/0116261 A1 * | 5/2012 | Mumaw et al. | 601/2 |

FOREIGN PATENT DOCUMENTS

| | | | |
|---|---|---|---|
| JP | 9097600 A | 4/1997 | |
| JP | 2003178744 A | 6/2003 | |
| WO | WO 2010124556 A1 * | 11/2010 | H01M 2/06 |
| WO | WO 2011/035630 A1 | 3/2011 | |

* cited by examiner

BATTERY HAVING MULTI-ORIENTATION CONDUCTIONS, BATTERY HOLDER HAVING MULTI-ORIENTATION CONDUCTIONS, AND BATTERY ASSEMBLING METHOD

BACKGROUND OF THE INVENTION

1. Technical Field

This disclosure relates to a battery for a portable electronic device, and more particularly to a battery having multi-orientation conductions, a battery holder having multi-orientation conductions, and a battery assembling method.

2. Related Art

A portable electronic device, such as a mobile phone, a personal digital assistant, or a portable navigation device, is powered by a battery pack. In order to operate the portable electronic device continuously, the battery is generally detachable and exchangeable. This type of battery pack is installed in a battery holder, and the battery and a power receiving terminal of the portable electronic device are connected through the battery holder.

Figure 1:
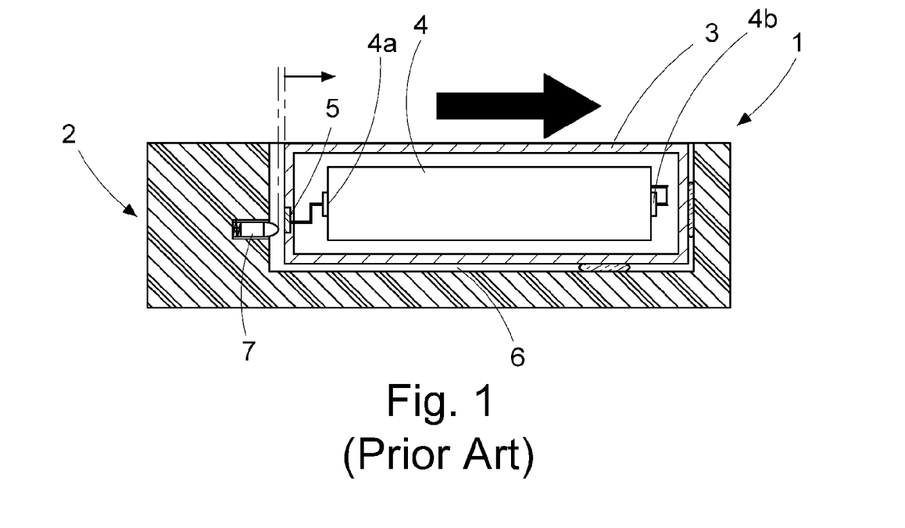
FIG. 1 is a cross-sectional view of a battery and a battery holder in the prior art.

FIG. 1 shows a battery pack 1 and a battery holder 2 in the prior art. In general, the battery pack 1 includes a casing 3, at least one battery cell 4, and contact pads 5. Generally, two contact pads 5 are disposed on a surface of the casing 3, and are connected to a positive electrode 4a and a negative electrode 4b of a battery cell 4, respectively. For simplification of description, FIG. 1 merely shows one contact pad 5 connected to the positive electrode 4a.

As shown in FIG. 1, the battery holder 2 includes an accommodating portion 6 and power receiving elements 7. The accommodating portion 6 is provided for accommodating the battery pack 1 and fixing the battery pack 1 in the battery holder 2. The number of the power receiving elements 7 matches the number of the contact pads 5. For simplification of description, FIG. 1 only shows one power receiving element 7. The power receiving element 7 is disposed in accommodating portion 6 and electrically connected to the power receiving terminal of the electronic device. When the battery pack 1 is placed in the accommodating portion 6, each of the power receiving element 7 presses against one of the contact pads 5 of the battery pack 1. Then the battery pack 1 is electrically connected to the power receiving terminal of the electronic device through the battery holder 2.

The type of the receiving element 7 includes a spring, a knife switch, and a pogo pin. For example, the receiving element 7 shown in FIG. 1 is a pogo pin. The spring, the knife switch, and the pogo pin all can apply elastic force on the contact pad 5, so that the receiving element 7 can keep good contact with the contact pad 5, thereby maintaining a power supply of the battery pack 1.

When an external force impacts the electronic device or the electronic device is subjected to high-frequency vibration, the battery pack 1 may be instantly displaced for a small distance with respect to the battery holder 2 in any direction. If the instant displacement of the battery pack 1 is just in a direction far away from the receiving element 7, the receiving element 7 may not be capable of responding in time, that is, a rebound speed of the receiving element 7 generated by the elastic force is less than a speed of the instant displacement of the battery pack 1. At this time, the contact between the receiving element 7 and the contact pad 5 is interrupted, so that the power supply of the battery pack 1 to the electronic device is interrupted instantly.

Due to the instant interruption of the power supply, the electronic device is instantly and abnormally shut down, and then the electronic device is re-started due to the recovery of the power supply. The abnormal shutdown and restarting process may cause damage to the electronic device, so that the electronic device fails to operate.

SUMMARY

In view of the problem of instant interruption of power supply caused by instant displacement of a battery in an electronic device, this disclosure is directed to a battery having multi-orientation conductions, so as to avoid the instant interruption of power supply of the battery.

This disclosure provides a battery having multi-orientation conductions, which is applicable for supplying power to an electronic device. The battery having multi-orientation conductions includes a casing, a battery pack, and at least two electrical connecting assemblies.

The casing includes an inner space and a plurality of contact planes. The contact planes are located on an outer surface of the casing respectively, and vertical directions of the contact planes are different from each other. The battery pack includes at least one battery cell disposed in the inner space, and the battery cell at least has a positive electrode and a negative electrode. Two electrical connecting assemblies are electrically connected to the positive electrode and the negative electrode respectively. The electrical connecting assemblies are provided for transmitting power between the battery pack and the electronic device.

The electrical connecting assembly electrically connected to the positive electrode is arranged on at least two of the contact planes, and the electrical connecting assembly electrically connected to the negative electrode is arranged on at least two of the contact planes.

When an external force is applied to the battery in one certain direction and one electrical connecting assembly corresponding to the positive electrode is incapable of being electrically connected to the electronic device through one certain contact plane, the positive electrode of the battery is electrically connected to the electronic device through at least one of the other contact planes.

Similarly, when the external force is applied to the battery in one certain direction and the other electrical connecting assembly corresponding to the negative electrode is incapable of being electrically connected to the electronic device through one certain contact plane, the negative electrode of the battery is electrically connected to the electronic device through at least one of the other contact planes.

For the purpose of using the battery, this disclosure further provides a battery holder having multi-orientation conductions, which is provided for accommodating a battery and electrically connecting to a positive electrode and a negative electrode of the battery.

The battery holder includes a holder body and a plurality of receiving assemblies.

The holder body has an accommodating trough and a plurality of inner planes. The accommodating trough is used for accommodating at least a part of the battery. The inner planes are located on an inner surface of the accommodating trough, and vertical directions of the inner planes are different from each other. The receiving assemblies are provided for being electrically connected to the positive electrode and the negative electrode respectively. The receiving assembly for being electrically connected to the positive electrode is arranged on at least two of the inner planes, and the receiving assembly for being electrically connected to the negative electrode is arranged on at least two of the inner planes.

When an external force is applied to the battery in one certain direction and the receiving assembly corresponding to the positive electrode is incapable of being electrically connected to the battery through one certain inner plane, the battery holder is electrically connected to the battery through at least one of the other inner planes.

Similarly, when the external force is applied to the battery in one certain direction and the receiving assembly corresponding to the negative electrode is incapable of being electrically connected to the battery through one certain inner plane, the battery holder is electrically connected to the battery through at least one of the inner planes.

This disclosure further provides a battery assembling method, which includes: providing a casing having an inner space; disposing a plurality of contact planes on an outer surface of the casing and arranging vertical directions of the contact planes to be different from each other; disposing a battery pack in the inner space of the casing, in which the battery pack at least has a positive electrode and a negative electrode; providing a plurality of electrical connecting assemblies and arranging each of the electrical connecting assemblies on at least two of the contact planes of the casing; electrically connecting the positive electrode to one of the electrical connecting assemblies on at least two of the contact planes; and electrically connecting the negative electrode to another one of the electrical connecting assemblies on at least two of the contact planes.

The battery according to this disclosure transmits power in multiple directions at the same time. If power transmission in one certain direction is interrupted, the battery transmits power in at least one of the other direction, thereby avoiding instant interruption of the power supply of the battery.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 2:
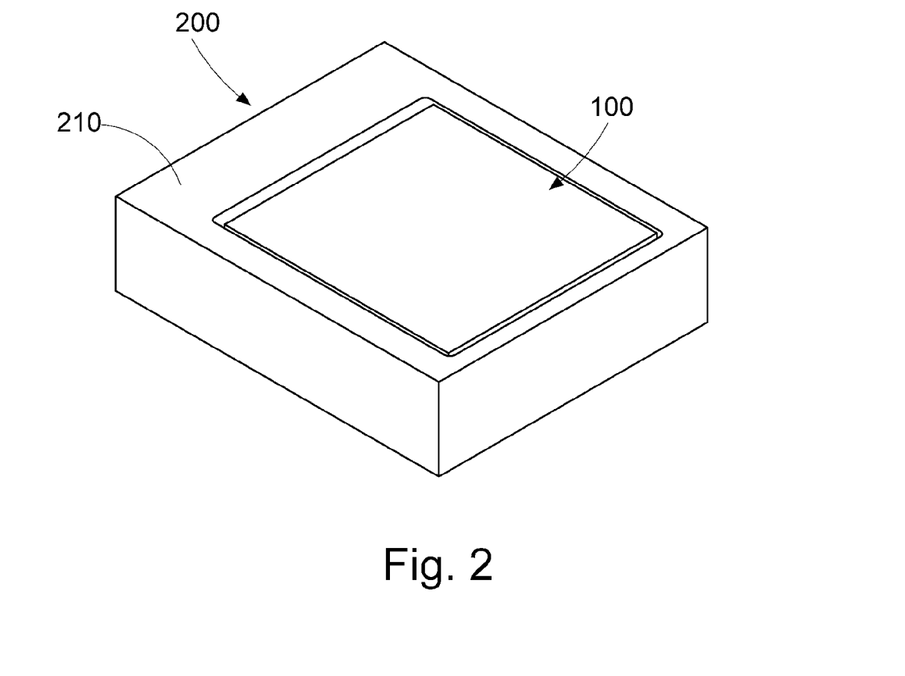
FIG. 2 is a perspective view of a first embodiment, in which a battery is combined with a battery holder.
Figure 3:
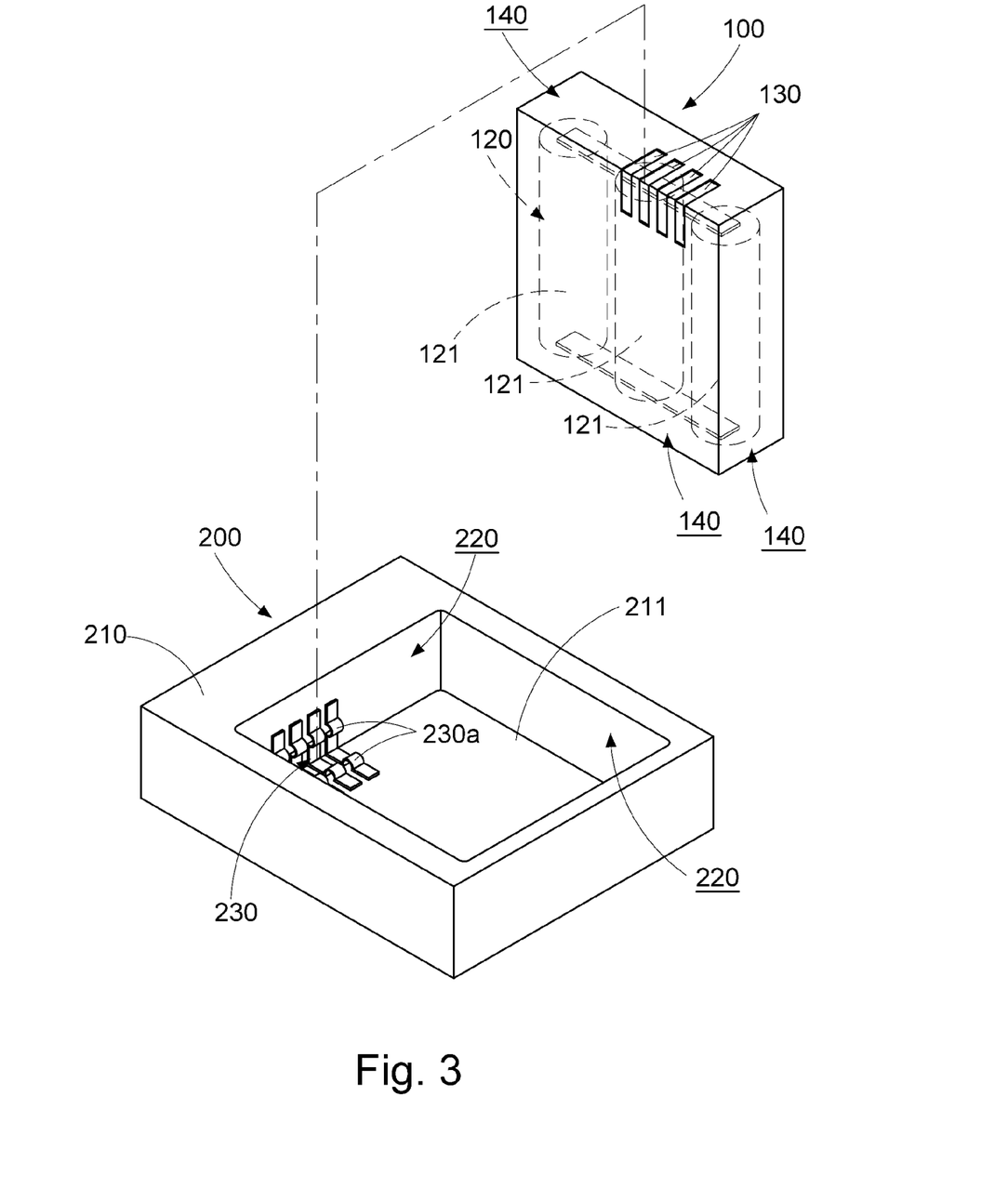
FIG. 3 is a perspective view of the first embodiment, in which the battery is detached from the battery holder.

FIG. 2 and FIG. 3 show a battery 100 having multi-orientation conductions according to a first embodiment, which is applicable for supplying power to an electronic device.

Figure 4:
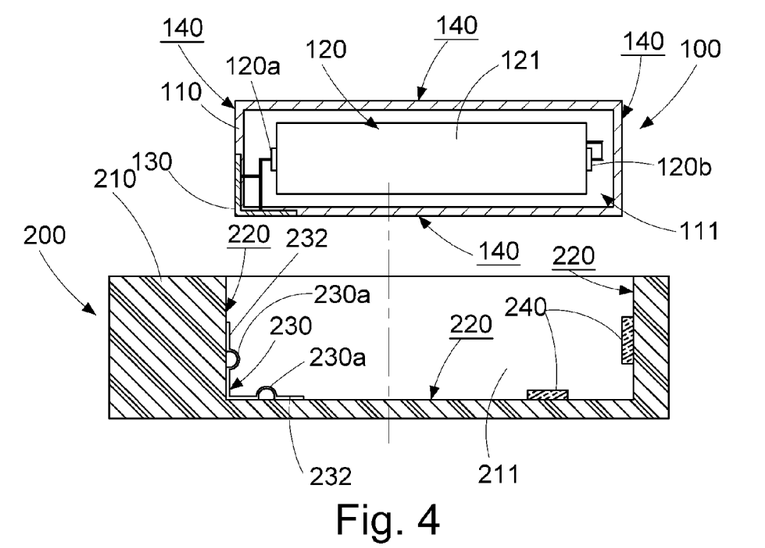
FIG. 4 is a cross-sectional view of the first embodiment, in which the battery is detached from the battery holder.

As shown in FIG. 2, FIG. 3, and FIG. 4, the battery 100 having multi-orientation conductions includes a casing 110, a battery pack 120, and a plurality of electrical connecting assemblies 130.

The casing 110 includes an inner space 111 and a plurality of contact planes 140. The contact planes 140 are located on an outer surface of the casing 110 respectively, and vertical directions of the contact planes 140 are different from each other. Implements of the contact planes 140 are not limited to planar surface; in at least one example, the contact planes 140 are successive curved surfaces to form a large cambered surface.

The battery pack 120 includes one or more battery cells 121. The battery cell 121 of the battery pack 120 is disposed in the inner space 111, and the battery pack 120 at least has a positive electrode 120a and a negative electrode 120b.

The battery 100 at least includes two electrical connecting assemblies 130. The two electrical connecting assemblies 130 are electrically connected to the positive electrode 120a and the negative electrode 120b respectively. The two electrical connecting assemblies 130 are provided for electrically connecting to the electronic device through power receiving terminals of the electronic device, so as to transmit power between the battery pack 120 and the electronic device. In addition, more electrical connecting assemblies 130 can be utilized to establish communication between the battery pack 120 and the electronic device. For example, one or more additional electrical connecting assemblies 130 are provided for transferring detection signals of detection elements to the electronic device, so that the electronic device can monitor the state of the battery 100.

As shown in FIG. 3 and FIG. 4, each of the electrical connecting assemblies 130 is arranged on at least two of the contact planes 140, and then such an electrical connecting assembly 130 includes plural electrical contacts arranged on at least two of the contact planes 140. In the first embodiment, the electrical connecting assembly 130 electrically connected to the positive electrode 120a is arranged on at least two of the contact planes 140, and the electrical connecting assembly 130 electrically connected to the negative electrode 120b is arranged on at least two of contact planes 140. The cross-sectional view of the battery 100 in FIG. 4 merely shows one electrical connecting assembly 130 electrically connected to the positive electrode 120a, and the electrical connecting assembly 130 electrically connected to the negative electrode 120b is substantially arranged in the same manner as that shown in FIG. 4.

Each of the electrical connecting assemblies 130 is an extension conductor extending on at least two of the contact planes 140. In the first embodiment, a side view of each extension conductor is L-shaped, and each extension conductor extends on two adjacent contact planes 140, so that the electrical connecting assembly 130 electrically connected to the positive electrode 120a is arranged on at least two of the contact planes 140, and the electrical connecting assembly 130 electrically connected to the negative electrode 120b is arranged on at least two of the contact planes 140.

As shown in FIG. 2, FIG. 3, and FIG. 4, the first embodiment further provides a battery holder 200 having multi-orientation conductions, which is provided for accommodating the battery 100 and electrically connected to the positive electrode 120a and the negative electrode 120b of the battery 100. In one example the battery holder 200 is a part of the electronic device; in another example the battery holder 200 is electrically connected to the power receiving terminals of the electronic device through wires. After the battery 100 is accommodated in the battery holder 200, the positive electrode 120a and the negative electrode 120b of the battery 100 are electrically connected to the electronic device through the battery holder 200.

As shown in FIG. 3 and FIG. 4, the battery holder 200 having multi-orientation conductions includes a holder body 210, a plurality of inner planes 220, and a plurality of receiving assemblies 230.

The holder body 210 has an accommodating trough 211 and a plurality of inner planes 220. The accommodating trough 211 is used for accommodating the battery 100. The inner planes 220 are located on an inner surface of the accommodating trough 211, and vertical directions of the inner planes 220 are different from each other. An inside profile of the accommodating trough 211 matches the whole or a part of the battery 100, so that at least a part of the battery 100 is capable of being accommodated in the accommodating trough 211, and the battery 100 is capable of being fixed to the holder body 210.

When the battery 100 is accommodated in the accommodating trough 211 of the battery holder 200, at least a part of contact planes 140 of the battery 100 face the inner planes 220 respectively, so as to fix the battery 100 in the holder body 210. The battery holder 200 further includes a plurality of pressing parts 240, for example, sponge pads. The pressing parts 240 are disposed on different inner planes 220 to be clamped between the battery 100 and the inner planes 220, so as to fix the battery 100 in the accommodating trough 211.

Generally, the number of the receiving assemblies 230 matches the number of the electrical connecting assemblies 130. At least two of the receiving assemblies 230 are disposed corresponding to the positive electrode 120a and the negative electrode 120b of the battery 100. Additional receiving assemblies 230 are provided for communication connection between the battery pack 120 and the electronic device.

The receiving assemblies 230 are disposed in the accommodating trough 211, and at least two of the receiving assemblies 230 are provided for being electrically connected to the positive electrode 120a and the negative electrode 120b respectively. Each of the receiving assemblies 230 has at least two power receiving points 230a pointing to different directions. Moreover, each of the receiving assemblies 230 includes at least two elastic contact reeds 232 connected to each other. Each elastic contact reeds 232 provides one of the power receiving point 230a. Each receiving assembly 230 extends on at least two of the inner planes 220. Namely, the two elastic contact reeds 232 of each receiving assembly 230 extend on at least two of the inner planes 220 that have their vertical directions different from each other. In this embodiment, a side view of the electrical connecting assembly 130 is substantially L-shaped. The two power receiving points 230a of each receiving assembly 230 are respectively located on side surfaces of the two elastic contact reeds 232.

In the accommodating trough 211, the receiving assembly 230 for being electrically connected to the positive electrode 120a is arranged on at least two of the inner planes 220, and the receiving assembly 230 for being electrically connected to the negative electrode 120b is arranged on at least two of the inner planes 220. That is to say, for the receiving assembly 230 for being electrically connected to the positive electrode 120a, the two power receiving points 230a are disposed on different inner planes 220 and point to different directions. Similarly, for the receiving assembly 230 for being electrically connected to the negative electrode 120b respectively, the two power receiving points 230a are also disposed on different inner planes 220 respectively and point to different directions.

Figure 5:
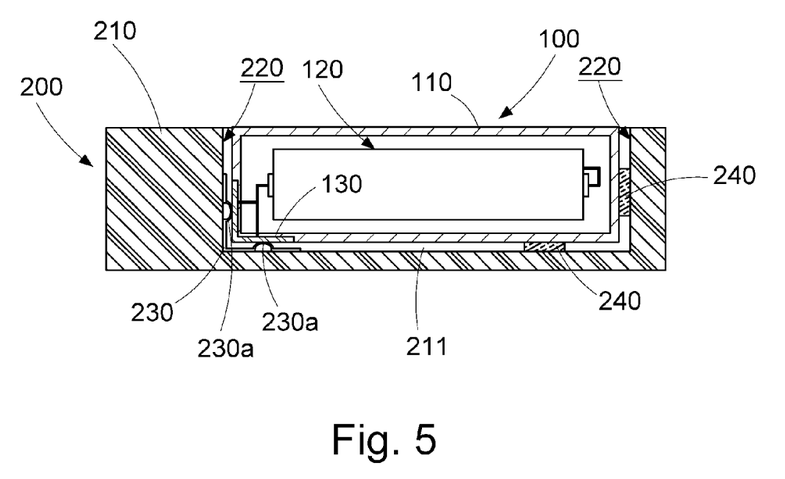
FIG. 5 is a cross-sectional view of the first embodiment, in which the battery is combined with the battery holder.

As shown in FIG. 5, when the battery 100 is placed into the accommodating trough 211 of the battery holder 200, each of the receiving assemblies 230 contacts the corresponding electrical connecting assembly 130 through the corresponding power receiving points 230a, so that the receiving assemblies 230 are electrically connected to the positive electrode 120a and the negative electrode 120b respectively through different electrical connecting assembly 130. As shown in FIG. 5, the power receiving points 230a of each receiving assembly 230 contact the corresponding electrical connecting assembly 130 in different directions. Since each of the receiving assemblies 230 is electrically connected to at least one of the power receiving terminals of the electronic device, the electrical connecting assemblies 130 of the battery 100 are electrically connected to the electronic device through the corresponding receiving assemblies 230 respectively and transmit the power between the battery pack 120 and the electronic device through the positive electrode 120a and the negative electrode 120b.

Figure 6:
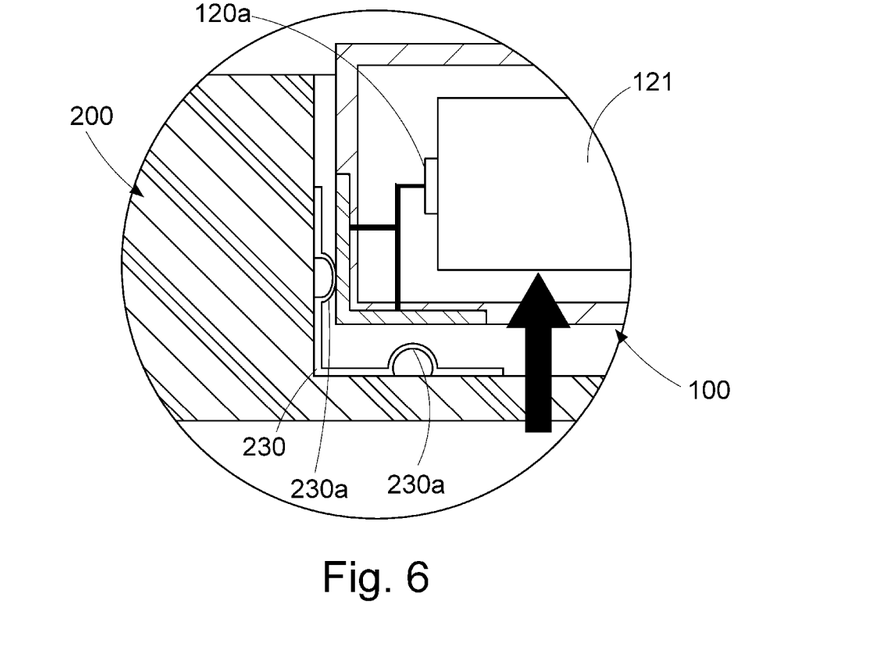
FIG. 6 and FIG. 7 are partial cross-sectional views of the first embodiment, in which the battery is displaced under an external force.
Figure 7:
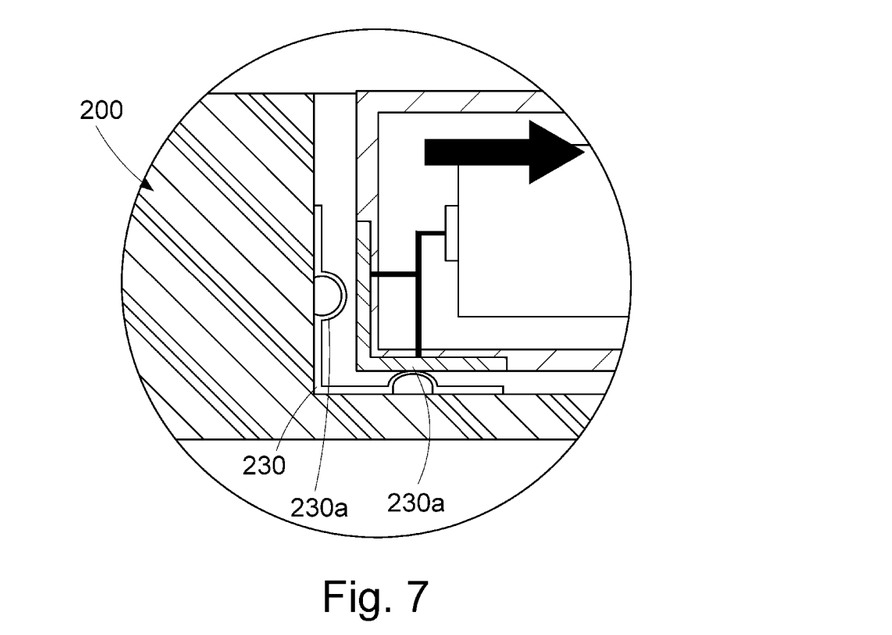

As shown in FIG. 6 and FIG. 7, when an external force is applied to the battery 100 in one certain direction, usually the battery 100 is displaced in this certain direction inside the accommodating trough 211. When the battery 100 is displaced, one of the power receiving points 230a of the receiving assemblies 230 probably fails to contact with the corresponding electrical connecting assembly 130 on one certain contact plane 140 of the battery 100, so that this power receiving point 230a fails to be electrically connected to the battery 100. That is, one of electrical connecting assemblies 130 is incapable of being electrically connected to the electronic device through one certain contact plane 140. The power receiving points 230a of each receiving assembly 230 point to different directions. If one of the power receiving points 230a points to a direction interlaced with a displacement direction of the battery 100, this power receiving point 230a can still keep contact with the corresponding electrical connecting assembly 130 on a different contact plane 140, so that the receiving assembly 230 maintains electrical connection with the corresponding electrical connecting assembly 130.

As shown in FIG. 6 and FIG. 7, when an external force is applied to the battery 100 in one certain direction and the battery 100 is displaced in this direction, the electrical connecting assembly 130 corresponding to the positive electrode 120a is probably incapable of being electrically connected to the electronic device through one certain contact plane 140. In other words, the receiving assembly 230 corresponding to the positive electrode 120a is probably incapable of being electrically connected to the battery 100 through one certain inner plane 220. At this time, the positive electrode 120a of the battery 100 is electrically connected to the electronic device through the electrical connecting assembly 130 corresponding to the positive electrode 120a on at least one of the other contact planes 140. In other words, the battery holder 200 is be electrically connected to the battery 100 through the electrical connecting assembly 130 corresponding to the positive electrode 120a on at least one of the other inner planes 220.

Partial cross-sectional views of FIG. 6 and FIG. 7 merely show one electrical connecting assemblies 130 electrically connected to the positive electrode 120a, and the electrical connecting assemblies 130 electrically connected to the negative electrode 120b substantially arranged in the same manner as shown in FIG. 6 and FIG. 7.

When an external force is applied to the battery 100 in one certain direction, and the electrical connecting assembly 130 corresponding to the negative electrode 120b is probably incapable of being electrically connected to the electronic device through one certain contact plane 140. At this time, the negative electrode 120b of the battery 100 is electrically connected to the electronic device through the electrical connecting assembly 130 corresponding to the negative electrode 120b on at least one of the other contact planes 140. In other words, when the receiving assembly 230 corresponding to the negative electrode 120b is incapable of being electrically connected to the battery 100 through one certain inner plane 220, the battery holder 200 is electrically connected to the battery 100 through the electrical connecting assembly 130 corresponding to the negative electrode 120b on at least one of the other inner plane 220.

Figure 8:
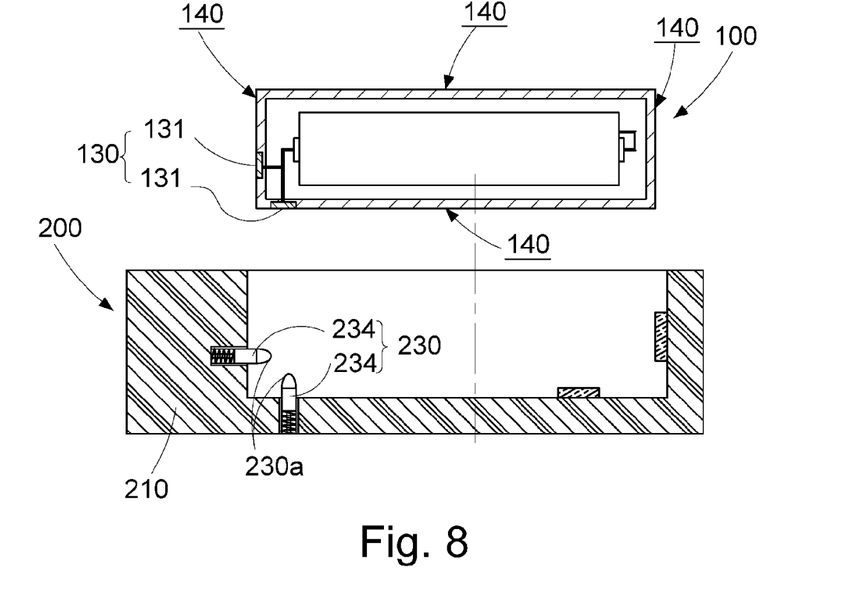
FIG. 8 is a cross-sectional view of a second embodiment, in which a battery is detached from a battery holder.

FIG. 8 shows a battery holder 200 having multi-orientation conductions according to a second embodimen, in which the battery holder 200 is provided for matching the battery 100 according to the first embodiment.

Most features of the battery holder 200 in the second embodiment are the same as those of the battery holder 200 in the first embodiment, and the difference of the two embodiments is described hereinafter. In the second embodiment, each of the receiving assemblies 230 includes a plurality of electrical contact elements 234 arranged on at least two of the inner planes 220. Each electrical contact element 234 provides at least one of the power receiving points 230a. An example of each electrical contact element 234 is a pogo pin, and an end of the pogo pin is the power receiving point 230a. The pogo pin retracts under pressure to generate an elastic force, so that the power receiving point 230a pushes and contacts the electrical connecting assembly 130 under the elastic force as a positive pressure applied on the electrical connecting assembly 130.

In the second embodiment, a battery 100 having multi-orientation conductions is also provided, and the difference of the battery 100 of the second embodiment and the battery 100 of the first embodiment is described hereinafter. In the second embodiment, each of the electrical connecting assemblies 130 includes a plurality of electrical contact elements 131 arranged on at least two of the contact planes 140. For the electrical connecting assembly 130 corresponding to the positive electrode 120a, the electrical contact elements 131 are electrically connected to the positive electrode 120a; and for the electrical connecting assembly 130 corresponding to the negative electrode 120b, the electrical contact elements 131 are electrically connected to the negative electrode 120b.

Figure 9:
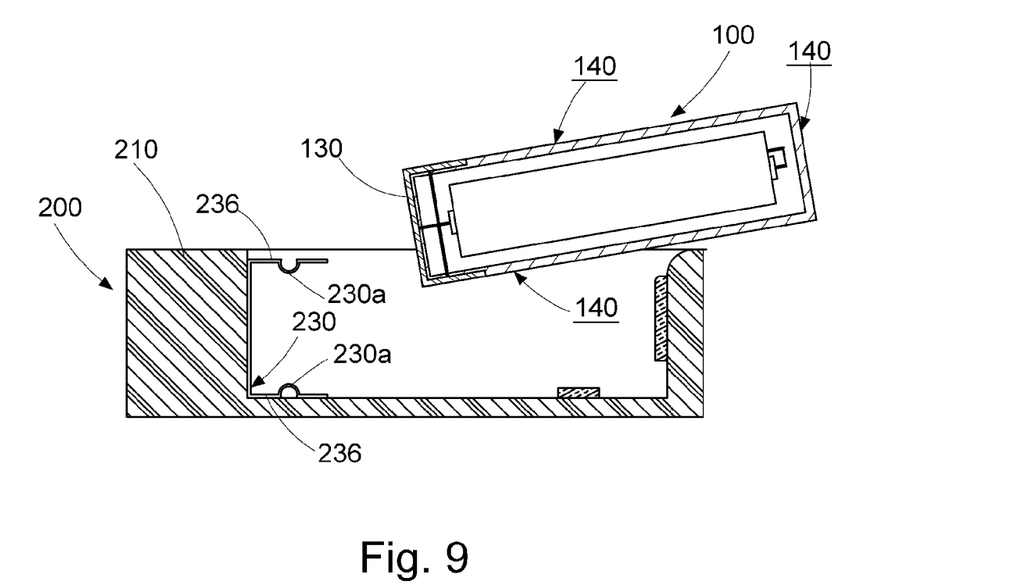
FIG. 9 is a cross-sectional view of a third embodiment, in which a battery is detached from a battery holder.

FIG. 9 shows a battery 100 having multi-orientation conductions according to a third embodiment, which is a modification of the battery 100 according to the first embodiment. Please refer to FIG. 9, in which each of the electrical connecting assemblies 130 extends on more than two contact planes 140. For example, each electrical connecting assembly extends on three successive contact planes 140, so that a side view of each of the electrical connecting assemblies 130 shows a structure approximately formed in C-shaped.

As shown in FIG. 9, for the purpose of matching the battery 100 according to the third embodiment, a battery holder 200 is also provided, which is a modification based on the battery holder 200 according to the first embodiment. Two elastic contact reeds 236 of each receiving assembly 230 face each other. The power receiving points 230a are respectively located on side surfaces of the two elastic contact reeds 236 facing each other.

Figure 10:
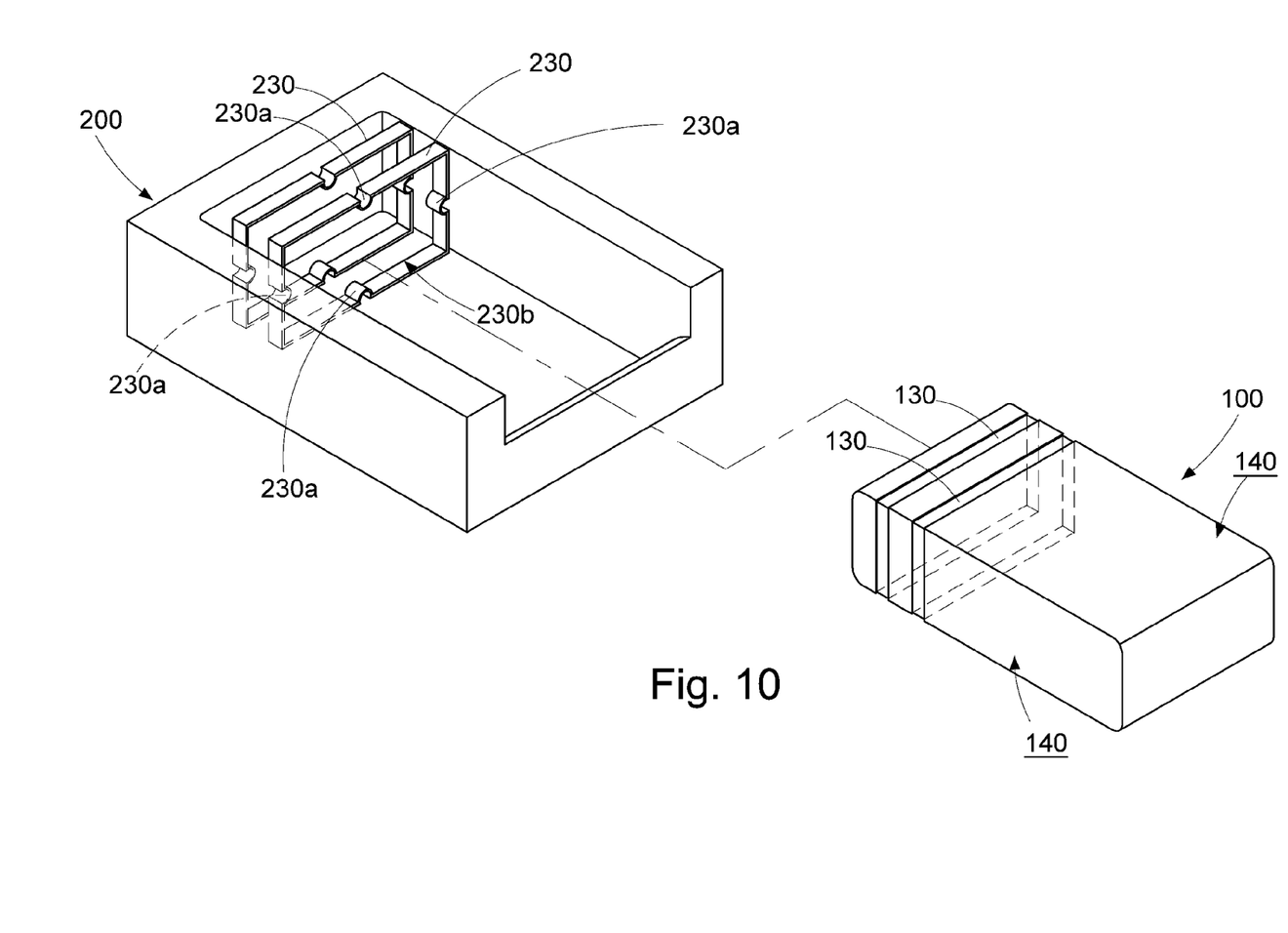
FIG. 10 is a perspective view of a fourth embodiment of the present invention, in which a battery is detached from a battery holder.

FIG. 10 shows a battery 100 having multi-orientation conductions according to a fourth embodiment, which is a modification of the battery 100 according to the first embodiment or the third embodiment. Please refer to FIG. 10, in which each of the electrical connecting assemblies 130 is an extension conductor and successively extends on the contact planes 140 surrounding the casing, so that each of the electrical connecting assemblies 130 encircles the casing 110 and a side view of each of the electrical connecting assemblies 130 shows a structure formed approximately in ring-shaped.

As shown in FIG. 10, for the purpose of matching the battery 100 according to the fourth embodiment, a battery holder 200 is also provided, which is a modification based on the battery holder 200 according to the first embodiment or the third embodiment. Each of the receiving assemblies 230 includes an elastic contact reeds connected formed in ring-shaped with an insertion area 230b for the battery 100 to be inserted into. Each of the receiving assemblies 230 is used to surround the battery 100, and the power receiving points 230a are located in the insertion area 230b and point different direction.

Figure 11:
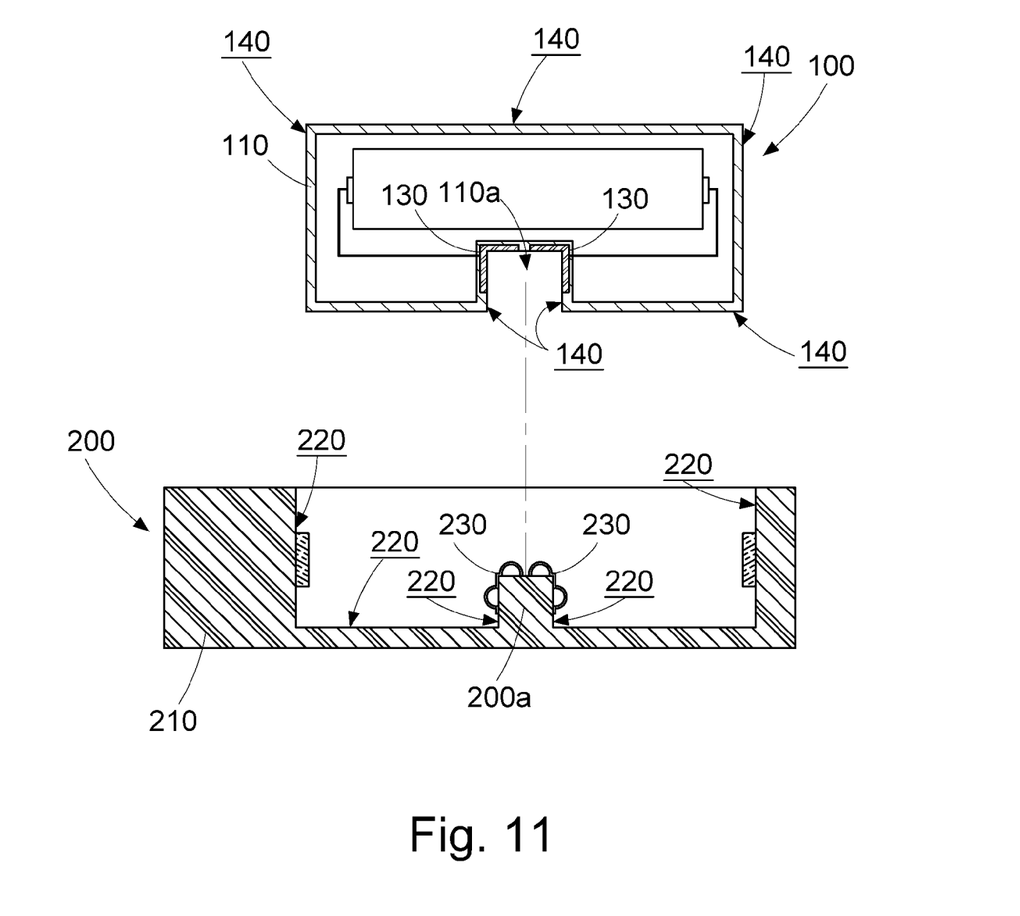
FIG. 11 is a cross-sectional view of a fifth embodiment, in which a battery is detached from a battery holder.

FIG. 11 shows a battery 100 having multi-orientation conductions according to a fifth embodiment. In the fifth embodiment, a slot 110a is formed on the outer surface of the casing 110, and at least two of the contact planes 140 are located in the slot 110a. The electrical connecting assemblies 130 are arranged on the contact planes 140 in the slot 110a.

As shown in FIG. 11, for the purpose of matching the battery 100 according to the fifth embodiment, a battery holder 200 is also provided. The battery holder 200 according to the fifth embodiment further includes an insertion block 200a disposed in the accommodating trough 211. At least two of the inner planes 220 are located on the insertion block 200a. The receiving assembly 230 electrically connected to the positive electrode 120a is arranged on two inner planes 220 of the insertion block 200a, and the receiving assembly 230 electrically connected to the negative electrode 120b is arranged on the two inner planes 220 of the insertion block 200a respectively, so as to match the electrical connecting assemblies 130 of the battery 100 respectively.

Figure 12:
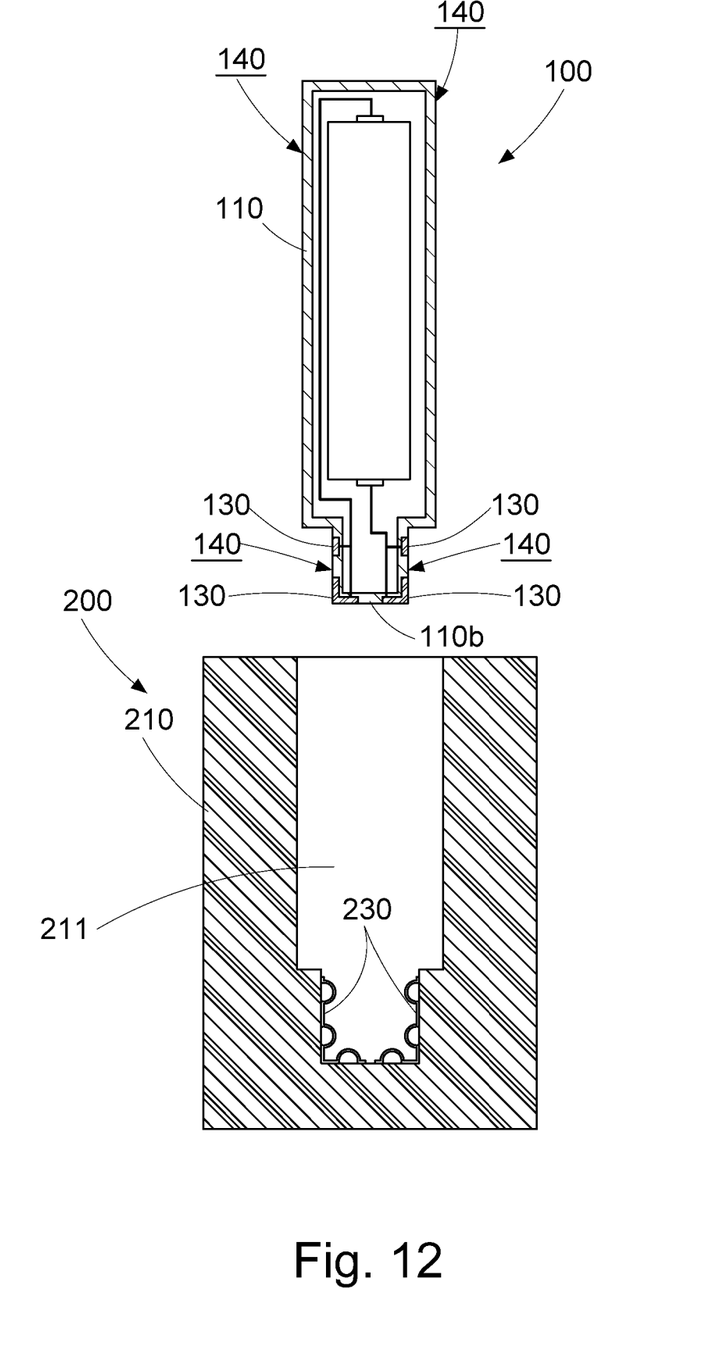
FIG. 12 is a cross-sectional view of sixth embodiment, in which a battery is detached from a battery holder.

FIG. 12 shows a battery 100 having multi-orientation conductions according to a sixth embodiment. In the sixth embodiment, a projecting portion 110b is formed on the outer surface of the casing 110. At least two of the contact planes 140 are located on the projecting portion 110b, and the electrical connecting assemblies 130 are arranged on the contact planes 140 on the projecting portion 110b.

As shown in FIG. 12, for the purpose of matching the battery 100 according to the sixth embodiment, a battery holder 200 is also provided. In the battery holder 200 according to the sixth embodiment, the internal profile of the accommodating trough 211 matches the projecting portion 110b of the battery 100, so that the projecting portion 110b is accommodated in the accommodating trough 211, and the battery 100 can be fixed in the holder body 210. Meanwhile, the projecting portion 110b is inserted into the accommodating trough 211 with each of the electrical connecting assemblies 130 contacting with the corresponding receiving assembly 230, so as to achieve power transmission.

Figure 13:
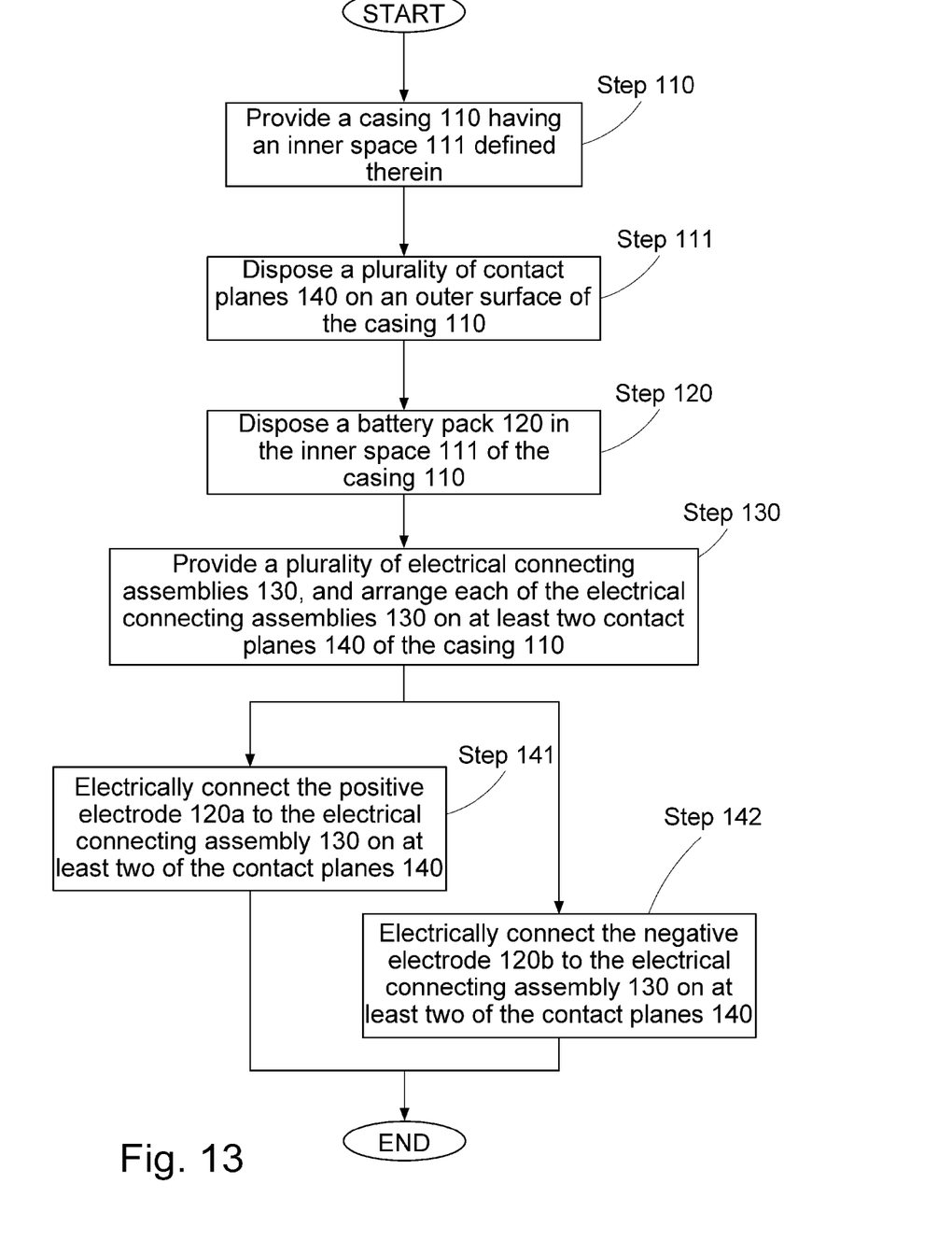
FIG. 13 is a flow chart of a battery assembling method according to this disclosure.

FIG. 13 shows a battery assembling method according to this disclosure, which includes the following steps.

Please refer to FIG. 13 and the structure of the battery 100s according to the foregoing embodiments. According to the method, a casing 110 is provided at first, in which an inner space 111 is in the casing, as shown in Step 110. A plurality of contact planes 140 are disposed on an outer surface of the casing 110 when the casing is fabricated, and vertical directions of the contact planes 140 are arranged to be different from each other, as shown Step 111.

A battery pack 120 is disposed in the inner space 111 of the casing 110, as shown in Step 120. The battery pack 120 at least has a positive electrode 120a and a negative electrode 120b.

A plurality of electrical connecting assemblies 130 are provided and each of the electrical connecting assemblies 130 is arranged on at least two of the contact planes 140 of the casing 110, as shown in Step 130.

When each of the electrical connecting assemblies 130 is a single electrical contact element, the electrical connecting assembly 130 is bent to form at least two elastic contact reeds connected to each other, and the electrical connecting assembly 130 is arranged to extend on at least two of the contact planes 140. For example, each of the electrical connecting assemblies 130 extends on two adjacent contact planes 140, or each of the electrical connecting assemblies 130 is arranged to surround the casing 110.

When the electrical connecting assembly 130 includes a plurality of electrical contact elements 234, the electrical contact elements 234 are disposed on different contact planes 140 respectively, so that the electrical contact elements 234 are arranged on at least two of the contact planes 140.

Next, the positive electrode 120a is electrically connected to one of the electrical connecting assemblies 130 arranged on at least two of the contact planes 140, as shown in Step 141. The negative electrode 120b is electrically connected to one of the the electrical connecting assemblies 130 arranged on at least two of the contact planes 140, as shown in Step 142. In this way, it can be ensured that the positive electrode 120a or the negative electrode 120b includes electrical contacts on at least two of the contact planes 140.

Figure 14:
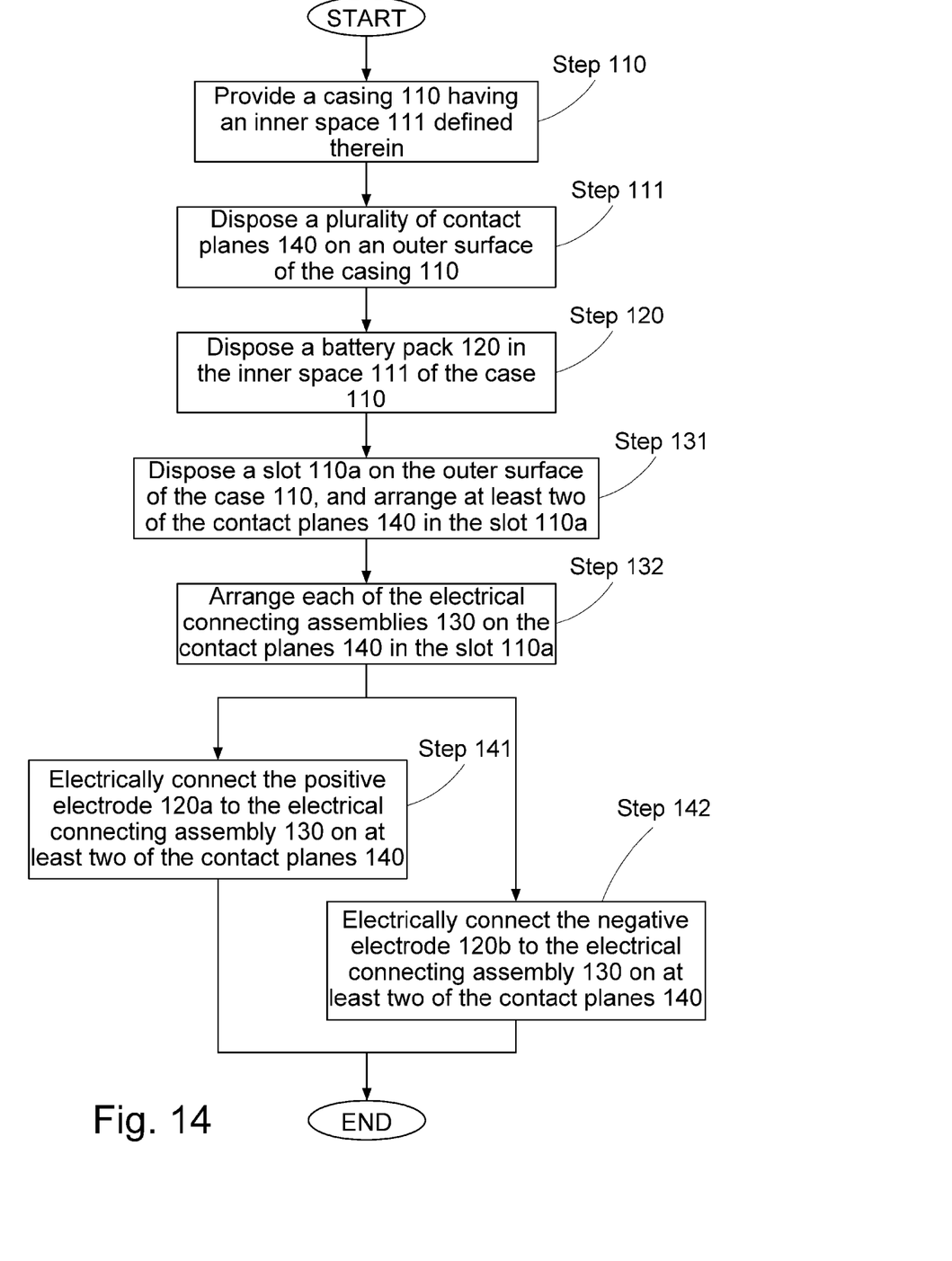
FIG. 14 is a flow chart of another battery assembling method according to this disclosure.

Please refer to FIG. 14, in which when the battery 100 according to the fifth embodiment is utilized, Step 130 has to be modified as follows. A slot 110a is disposed in the outer surface of the casing 110, and at least two of the contact planes 140 are located in the slot 110a, as shown in Step 131. The electrical connecting assembly 130 electrically connected to the positive electrode 120a is arranged on at least two of the contact planes 140 in the slot 110a, and the electrical connecting assembly 130 electrically connected to the negative electrode 120b is arranged on at least two contact planes 140 in the slot 110a, as shown in Step 132.

Figure 15:
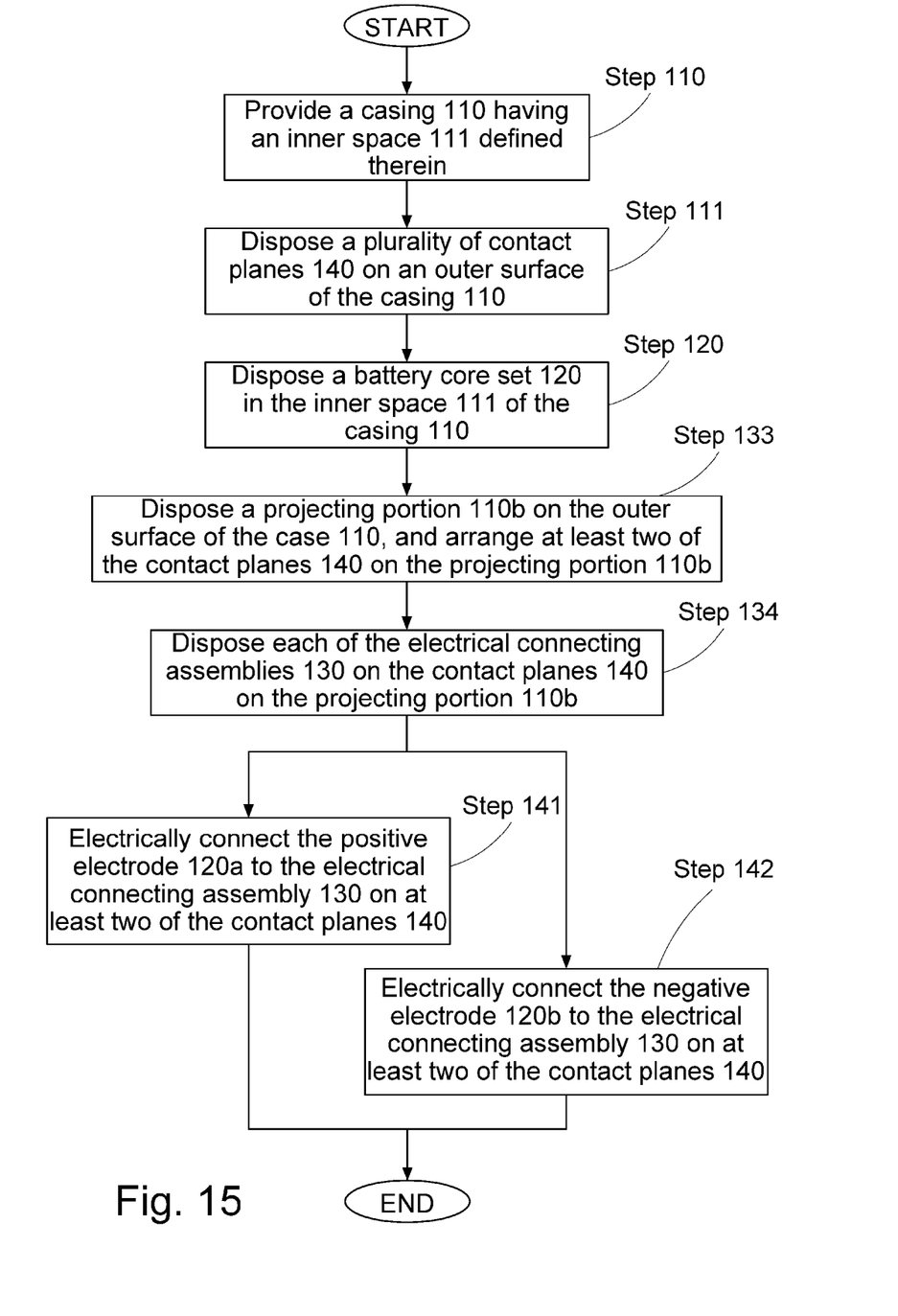
FIG. 15 is a flow chart of yet another battery assembling method according to this disclosure.

Please refer to FIG. 15, in which when the battery 110 according to the sixth embodiments is utilized, Step 130 has to be modified as follows. A projecting portion 110b is disposed on the outer surface of the casing 110, and at least two of the contact planes 140 are located on the projecting portion 110b, as shown in Step 133. The electrical connecting assembly 130 electrically connected to the positive electrode 120a is arranged on at least two of the contact planes 140 on the projecting portion 110b, and the electrical connecting assembly 130 electrically connected to the negative electrode 120b is arranged on at least two contact planes 140 on the projecting portion 110b, as shown in Step 134.

In this disclosure, the electrical connecting assembly 130 corresponding to the same electrode (the positive electrode 120a or the negative electrode 120b) is arranged on at least two of plural contact planes 140 at the same time, so that the battery 100 transmit power in multiple directions at the same time. If power transmission in one certain direction is interrupted, the battery transmits power through at least one of the other directions, thereby avoiding the power supply of the battery 100 from being interrupted.

What is claimed is:

1. A battery having multi-orientation conductions, for supplying power to an electronic device having a battery holder comprising an accommodating trough, the accommodating trough comprising a plurality of inner planes and at least a first receiving assembly and a second receiving assembly, each receiving assembly comprising at least a first contact portion and a second contact portion located on two different inner planes of the accommodating trough, the battery comprising:

a casing, having an inner space and an outer surface, wherein the outer surface comprises a plurality of contact planes;

a battery pack, comprising a battery cell disposed in the inner space, wherein the battery cell has at least a positive electrode and a negative electrode;

a first electrical connecting assembly disposed on the casing and comprising at least a first contact portion and a second contact portion respectively located on two different contact planes of the casing for respectively contacting the first and second contact portions of the first receiving assembly and transmitting power between the positive electrode and the electronic device via the first receiving assembly, wherein a first electrical pathway from the positive electrode branches and then connects to each of the first contact portion and the second contact portion of the first electrical connecting assembly by two distinct electrical connections inside the casing, wherein the first and second contact portions of the first electrical connecting assembly are two separate contact points separated by a first portion of the outer surface of the casing;

a second electrical connecting assembly disposed on the casing and comprising at least a first contact portion and a second contact portion respectively located on two different contact planes of the casing for respectively contacting the first and second contact portions of the second receiving assembly and transmitting power between the negative electrode and the electronic device, wherein a second electrical pathway from the negative electrode branches and then connects to each of the first contact portion and the second contact portion of the second electrical connecting assembly by two distinct electrical connections inside the casing, and wherein the first and second contact portions of the second electrical connecting assembly are two separate contact points separated by a second portion of the outer surface of the casing;

wherein, when the battery is received in the accommodating trough of the battery holder, the first contact portion of the first electrical connecting assembly is located in a position corresponding to the first contact portion of the first receiving assembly, and the second contact portion of the first electrical connecting assembly is located in a position corresponding to the second contact portion of the first receiving assembly, and two distinct electrical connections are made between the positive electrode and the first and second contact portions of the first receiving assembly via the first electrical pathway and the first and second contact portions of the first electrical connecting assembly; and wherein, when the battery is received in the accommodating trough of the battery holder, the first contact portion of the second electrical connecting assembly is located in a position corresponding to the first contact portion of the second receiving assembly, and the second contact portion of the second electrical connecting assembly is located in a position corresponding to the second contact portion of the second receiving assembly, and two distinct electrical connections are made between the negative electrode and the first and second contact portions of the second receiving assembly via the second electrical pathway and the first and second contact portions of the second electrical connecting assembly.

2. The battery having multi-orientation conductions according to claim 1, wherein a slot is formed on the outer surface of the casing, and first and second contact portions of the first and second electrical connecting assemblies are arranged in the slot.

3. The battery having multi-orientation conductions according to claim 1, wherein a projecting portion is formed on the outer surface of the casing, and the first and second contact portions of the first and second electrical connecting assemblies are arranged on the projecting portion.

4. A battery system, comprising: a battery holder comprising:
 a holder body, having an accommodating trough and a plurality of inner planes located on an inner surface of the accommodating trough; and
 at least a first receiving assembly and a second receiving assembly, each receiving assembly comprising at least a first contact portion and a second contact portion located on two different inner planes of the accommodating trough; and
a battery comprising:
 a casing, having an inner space and an outer surface, wherein the outer surface comprises a plurality of contact planes;
 a battery pack, comprising a battery cell disposed in the inner space, wherein the battery cell has at least a positive electrode and a negative electrode;
 a first electrical connecting assembly disposed on the casing and comprising at least a first contact portion and a second contact portion respectively located on two different contact planes of the casing for respectively contacting the first and second contact portions of the first receiving assembly and transmitting power between the positive electrode and the electronic device via the first receiving assembly, wherein a first electrical pathway from the positive electrode branches and then connects to each of the first contact portion and the second contact portion of the first electrical connecting assembly by two distinct electrical connections inside the casing, and wherein the first and second contact portions of the first electrical connecting assembly are two separate contact points separated by a first portion of the outer surface of the casing;
 a second electrical connecting assembly disposed on the casing and comprising at least a first contact portion and a second contact portion respectively located on two different contact planes of the casing for respectively contacting the first and second contact portions of the second receiving assembly and transmitting power between the negative electrode and the electronic device, wherein a second electrical pathway from the negative electrode branches and then connects to each of the first contact portion and the second contact portion of the second electrical connecting assembly by two distinct electrical connections inside the casing, and wherein the first and second contact portions of the second electrical connecting assembly are two separate contact points separated by a second portion of the outer surface of the casing;
wherein, when the battery is received in the accommodating trough of the battery holder, the first contact portion of the first electrical connecting assembly is located in a position corresponding to the first contact portion of the first receiving assembly, and the second contact portion of the first electrical connecting assembly is located in a position corresponding to the second contact portion of the first receiving assembly, and two distinct electrical connections are made between the positive electrode and the first and second contact portions of the first receiving assembly via the first electrical pathway and the first and second contact portions of the first electrical connecting assembly; and
wherein, when the battery is received in the accommodating trough of the battery holder, the first contact portion of the second electrical connecting assembly is located in a position corresponding to the first contact portion of the second receiving assembly, and the second contact portion of the second electrical connecting assembly is located in a position corresponding to the second contact portion of the second receiving assembly, and two distinct electrical connections are made between the negative electrode and the first and second contact portions of the second receiving assembly via the second electrical pathway and the first and second contact portions of the second electrical connecting assembly.

5. The battery holder having multi-orientation conductions according to claim 4, wherein the first and second contact portions of the first and second receiving assemblies comprise at least two power receiving points pointing to different directions.

6. The battery holder having multi-orientation conductions according to claim 5, wherein the first and second receiving assemblies comprise a plurality of electrical contact elements arranged on at least two of the inner planes, and each electrical contact element provides at least one of the power receiving points.

7. The battery holder having multi-orientation conductions according to claim 6, wherein the first and second receiving assemblies each comprise at least two elastic contact reeds connected to each other, wherein the power receiving points are respectively disposed on the elastic contact reeds.

8. The battery holder having multi-orientation conductions according to claim 7, wherein the power receiving points are respectively located on side surfaces of the elastic contact reeds.

9. The battery holder having multi-orientation conductions according to claim 7, wherein the two elastic contact reeds of each of the first and second receiving assemblies face each other.

10. The battery having multi-orientation conductions according to claim 1, wherein the plurality of contact planes are perpendicular.

11. The battery having multi-orientation conductions according to claim 1, wherein the first and second contact portions of the first and second electrical connecting assemblies are located on the same two of the contact planes.

* * * * *